United States Patent [19]

Endo

[11] Patent Number: 5,732,373

[45] Date of Patent: Mar. 24, 1998

[54] CONTROL APPARATUS WITH STABILITY COMPENSATOR FOR ELECTRIC POWER STEERING SYSTEM

[75] Inventor: Shuji Endo, Maebashi, Japan

[73] Assignee: NSK, Ltd., Tokyo, Japan

[21] Appl. No.: 629,893

[22] Filed: Apr. 10, 1996

[30] Foreign Application Priority Data

Apr. 21, 1995 [JP] Japan ................................. 7-119011

[51] Int. Cl.$^6$ ......................................... B62D 5/04
[52] U.S. Cl. .................. 701/42; 701/41; 180/443
[58] Field of Search ............... 364/424.051, 424.052; 180/443, 446

[56] References Cited

U.S. PATENT DOCUMENTS

| | | | |
|---|---|---|---|
| 4,951,199 | 8/1990 | Whitehead | 364/424.05 |
| 5,040,629 | 8/1991 | Matsuoka et al. | 180/79.1 |
| 5,182,711 | 1/1993 | Takahashi et al. | 364/424.05 |
| 5,602,451 | 2/1997 | Kohge et al. | 318/293 |
| 5,631,529 | 5/1997 | Shimizu et al. | 318/432 |

FOREIGN PATENT DOCUMENTS 6-183355  7/1994  Japan.

*Primary Examiner*—Michael Zanelli
*Attorney, Agent, or Firm*—Brinks Hofer Gilson & Lione

[57] ABSTRACT

A control apparatus to be employed in electric power steering system for controlling the output of a motor aiding a steering operation in accordance with the value of a current control signal computed from a detected motor current and the value of a current command signal computed in accordance with a steering torque. The control apparatus comprises an electronic control circuit including a CPU. A stabilization compensator is inserted into a later stage of a torque sensor for detecting a steering torque in order to improve the stability and responsiveness of the control system. The characteristic of the stabilization compensator is expressed by the following characteristic C(s) which has a functions to eliminate a peak at a resonance frequency of a resonance system including inertia and spring elements in the electric power steering system:

$$C(s) = (s^2 + a_1 s + a_2)/(s^2 + b_1 s + b_2)$$

where notation s is the Laplacean operator and symbols $a_1$, $a_2$, $b_1$ and $b_2$ denote parameters determined by the resonance frequency of the resonance system.

6 Claims, 7 Drawing Sheets

CONTROL APPARATUS WITH STABILITY COMPENSATOR FOR ELECTRIC POWER STEERING SYSTEM

BACKGROUND OF THE INVENTION

1. Field of the Invention

The present invention relates to a control apparatus employed in electric power steering system.

2. Description of the Prior Art

The electric power steering system of a vehicle is used for aiding manual steering operation by performing the steps of: detecting a steering torque generated at a steering shaft by the operation of the steering wheel and a car speed; processing a current command representing a control target of a motor joined to a steering system in accordance with the detected torque and car speed; finding a current control value by computing a difference between the current command value representing the control target and the value of a current actually flowing through the motor; and controlling the motor using the current control value obtained at the previous step.

In general, the motor is controlled in such a way that, at a low vehicle speed, the output for aiding the manual steering operation is increased to make the load of the handle operation light and, at a high vehicle speed, on the other hand, the output is reduced to make the load of the handle operation heavy.

In such electric power steering system, the stability of the control system is sustained by means of a phase compensating circuit inserted into the later stage of a torque sensor.

In addition, in such electric power steering system, the response of the control apparatus deteriorates due to the moment of inertia of the motor joined to the steering system, worsening the feeling of steering operation. As is generally known, attempts have been made to improve the response of the control system by adding differential values of the steering torque to the current command value.

In addition, such electric power steering system constitutes a resonance system comprising the motor and a torsion bar as a mass and spring elements respectively. When the resonance system triggers vibration, the feeling of steering operation worsens. For this reason, a band eliminating filter is inserted into the later stage of the torque sensor employed in the control system, which filter is used for reducing the effects of a resonance frequency component, in order to suppress the vibration of the resonance system as is generally known. This technique for improving the feeling of steering operation is disclosed in Japanese Patent Laid-open No. Hei6-183355.

However, the stability and the response of the control system employed in the electric power steering system described above are antagonistic characteristics opposing each other. To be more specific, if the stability is improved, the responsiveness is deteriorated and, if the responsiveness is enhanced, on the other hand, the stability inevitably worsens. In other words, it is difficult to improve both the characteristics at the same time. In addition, a band eliminating filter is used for eliminating a resonance frequency component generated by a resonance system comprising, among other components, the motor and the torsion bar included in the electric power steering system as described above. Not only does the use of such a filter deteriorate the response for frequencies equal to and lower than a center frequency, at which the component is eliminated, but, in some cases, it is also difficult to obtain a good vibration suppressing effect due to variations in accuracy of components constituting the filter and other elements.

In addition, it is desirable to provide a non-linear characteristic of system such as the hydraulic power steering system to the command specifying a steering power for aiding the manual steering operation. However, problems arise due to the fact that, in the case of the hydraulic power steering system, it is difficult to design a control system by taking the non-linear characteristic into consideration or by taking variations in dynamic characteristics caused by different operating states into consideration. On the top of that, once a control system is designed, it is also difficult to implement the designed control system into a digital circuit because of the increased order of the control system.

SUMMARY OF THE INVENTION

It is an object of the present invention to provide a control apparatus that improves both the stability and response of a control system employed in electric power steering system for vehicles at the same time.

It is another object of the present invention to provide a control apparatus that improves both the stability and response of a control system employed in electric power steering system for vehicles by removing a peak value at the resonance frequency and compensating for a phase shift at the resonance frequency of a resonance system comprising spring and inertia elements which peak value and phase shift are included in a detected torque.

Other objects of the present invention will probably become apparent from the following detailed description of preferred embodiments with reference to accompanying diagrams.

DETAILED DESCRIPTION OF THE PREFERRED EMBODIMENTS

Figure 1:
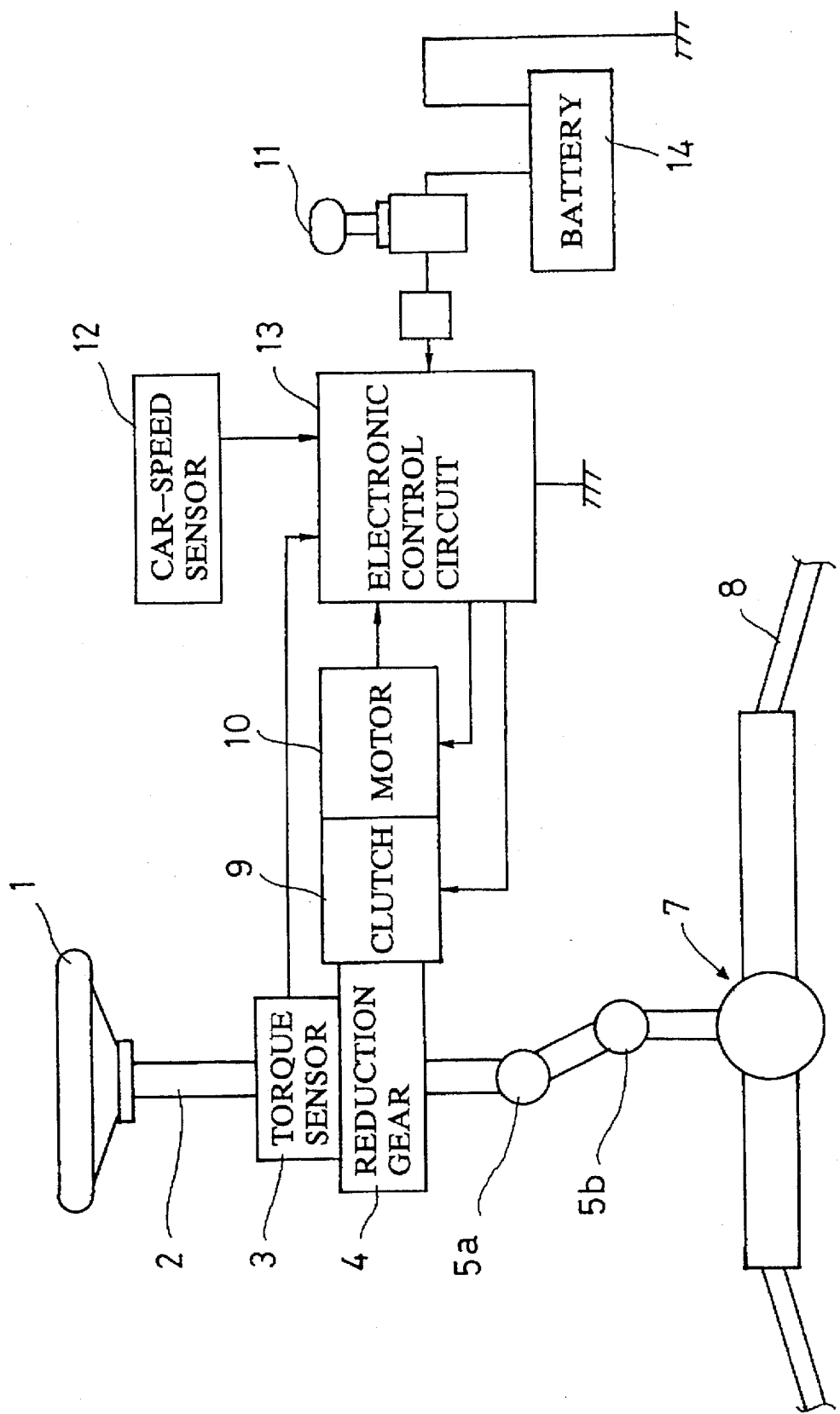
FIG. 1 is a diagram used for explaining the outline of the constitution of electric power steering system.

The present invention will become apparent from the following detailed description of preferred embodiments with reference to accompanying diagrams. FIG. 1 is a diagram used for explaining the outline of the constitution of electric power steering system to which the present invention is applied. As shown in the figure, a shaft 2 of a steering wheel 1 is joined to a tie rod 8 of a steering wheel through a reduction gear 4, universal joints 5a and 5b and a pinion-rack mechanism 7. A torque sensor 3 for detecting a steering torque is provided on the shaft 2. In addition, a motor 10 for aiding a manual steering operation is joined to the shaft 2 through a clutch 9 and the reduction gear 4.

The clutch 9 is controlled by an electronic control circuit 13 explained below. In a normal operating state, the clutch 9 is engaged. In the event of a failure detected by the electronic control circuit 13 in the power steering system and when the power supply is turned off, the clutch 9 is disengaged.

Electric power is supplied by a battery 14 to the electronic control circuit 13 for controlling the power steering system through an ignition key 11. The electronic control circuit 13 computes the value of a current command from a steering torque detected by the torque sensor 3 and a car speed detected by a car-speed sensor 12. The value of the current command computed by the electronic control circuit 13 is used in a feedback system for controlling a current supplied to the motor 10.

Figure 2:
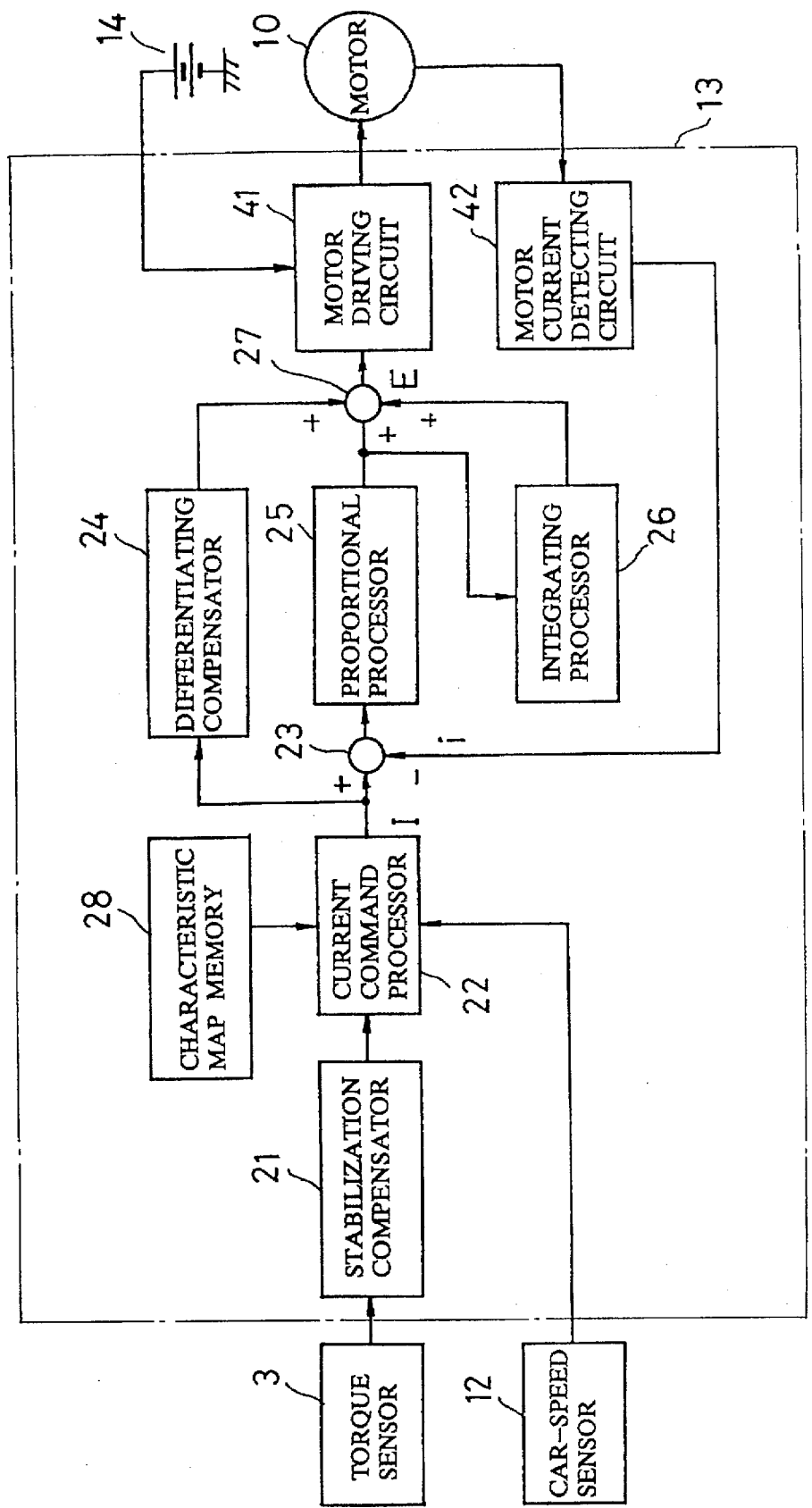
FIG. 2 is a block diagram showing an electronic control circuit.

FIG. 2 is a block diagram showing the electronic control circuit 13 provided by the present embodiment. The electronic control circuit 13 is constituted into a microcomputer which is referred to hereafter merely as a CPU. As is shown in the figure, the electronic control circuit 13 comprises functional blocks which are executed by a program in the CPU.

The electronic control circuit 13 shown in FIG. 2 is different from an electronic control circuit for controlling the conventional power steering system in that, in the case of the electronic control circuit 13, a stabilization compensator 21 provided by the present invention is incorporated at a later stage of the torque sensor 3 for detecting a steering torque. Compensation is carried out by the stabilization compensator 21 in order to enhance the stability and response of the control system, suppress vibration and, thus, provide a good feeling of steering operation. Details of the stabilization compensator 21 will be described later.

First of all, the operation and constitution of the electronic control circuit 13 are outlined. A signal received from the torque sensor 3, which signal represents the steering torque, undergoes a predetermined compensation process in the stabilization compensator 21 to be explained later in detail before being supplied to a current-command processor 22. In addition, a signal representing the car speed detected by the car-speed sensor 12 is also supplied to the current-command processor 22.

The current-command processor 22 computes the value I of a current command, which indicates a control target to be supplied to the motor 10, by using predetermined arithmetic equations based on a signal representing the steering torque, which signal has completed the predetermined compensation process in the stabilization compensator 21, a signal representing the car speed and values of an assistance torque command stored in a characteristic map memory unit 28.

A circuit comprising a comparator 23, a differentiating compensator 24, a proportional processor 25, an integrating processor 26 and an adder 27 is used for executing feedback control so as to make the magnitude i of the actual motor current equal to the value I of the current command.

The proportional processor 25 outputs a proportional value proportional to the difference between the value I of the current command and the magnitude i of the actual motor current. In order to improve the characteristics of the feedback control system, the signal output by the proportional processor 25 is further integrated by the integrating processor 26 to produce a signal proportional to an integrated value of the difference.

In order to increase the response speed of the magnitude i of the current actually flowing through the motor 10 relative to the value I of the current command, the differentiating compensator 24 outputs a differential value of the value I of the current command.

The proportional value output by the proportional processor 25 which value is proportional to the difference between the value I of the current command and the magnitude i of the actual motor current, the integrated value output by the integrating processor 26 and the differential value output by the differentiating compensator 24 are summed up by an adder 27. A current-control value E resulting from the addition is output by the adder 27 to a motor driving circuit 41 as a motor driving signal.

Figure 3:
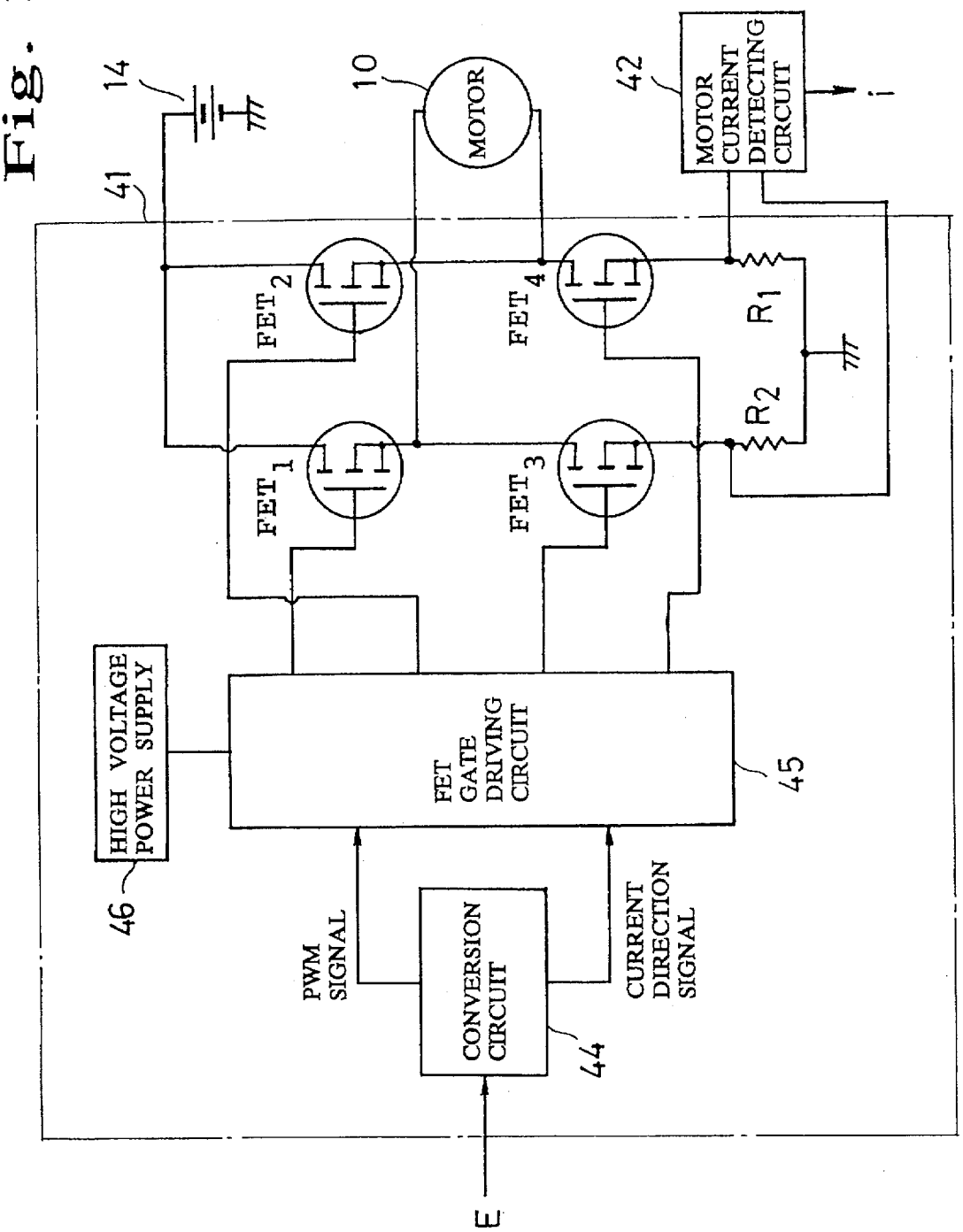
FIG. 3 is a circuit block diagram showing a motor driving circuit.

A typical constitution of the motor driving circuit 41 is shown in FIG. 3. As is shown in the figure, the motor driving circuit 41 comprises, among other components, a conversion circuit 44 for converting the current-control value E received from the adder 27 into a pulse width modulation (PWM) signal and a current-direction signal and separating them each other, a gate driving circuit 45 for driving the gate of an FETs (field effect transistors) 1 to 4 composing an H bridge circuit wherein the FETs 1 and 3 form the first arm of the H bridge circuit whereas the FETs 2 and 4 constitute the second arm thereof. It should be noted that a high voltage power supply 46 drives the high side of the FETs 1 and 2.

The PWM (Pulse Width Modulation) signal has a pulse width used for determining the magnitude of a current flowing through the motor as follows. The absolute value of the current-control value E output by the adder 27 is used for determining the duty cycle of the PWM signal. The duty cycle in turn determines a ratio of the ON period to the OFF period of a FET. The FETs 1 and 2 are turned on and off when the gates thereof are set at the high and low levels respectively in accordance with the duty cycle of the PWM signal, controlling the magnitude of the current flowing to the motor.

The current-direction signal is a signal specifying the direction of the current supplied to the motor in accordance with the sign of the current-control value E, that is, in accordance with whether the current-control value E is positive or negative. The FETs 3 and 4 are turned on and off when the gates thereof are set at the high and low levels respectively by the current-direction signal, reversing the direction of the current flowing to the motor and, thus, the rotational direction of the motor 10. It should be noted that when the FET 3 is turned on, the FET 4 is turned off and vice versa.

With the FET 4 put in a conductive state, the current flows into the motor 10 in the positive direction through the FET 1, the motor 10, the FET 4 and a resistor R1. With the FET 3 put in a conductive state, on the other hand, the current flows into the motor 10 in the negative direction through the FET 2, the motor 10, the FET 3 and a resistor R2.

The motor current detecting circuit 42 detects the magnitude of the current flowing in the positive direction from a voltage drop across the terminals of the resistor R1. Likewise, the motor current detecting circuit 42 detects the magnitude of the current flowing in the negative direction from a voltage drop across the terminals of the resistor R2.

The detected magnitude i of the current actually flowing through the motor 10 is supplied to the comparator 23 as a feedback input as is shown in FIG. 2.

Figure 4:
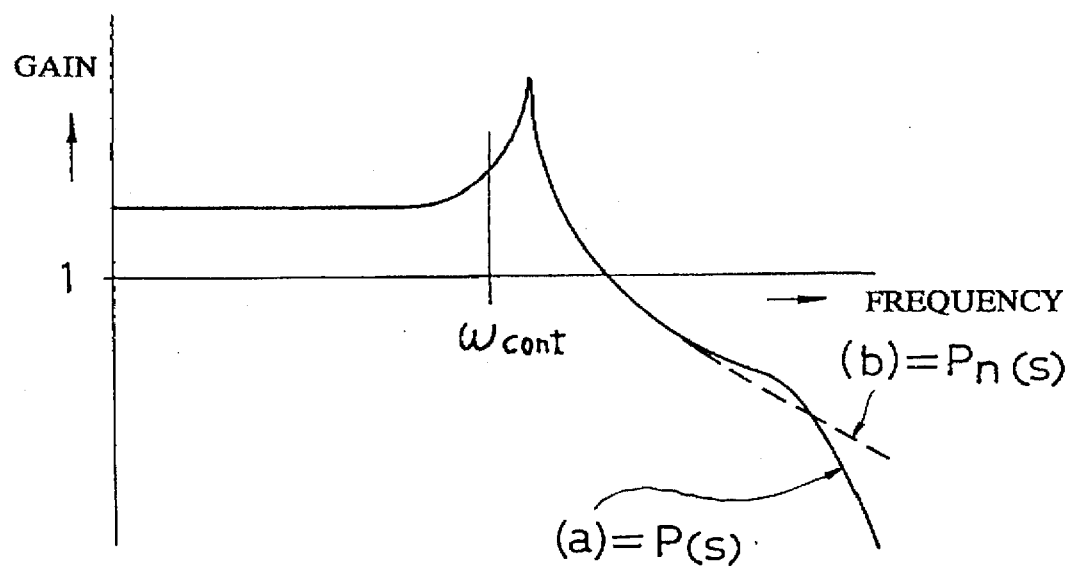
FIG. 4 is a diagram showing a frequency characteristic of an actual control object and a model approximating of the actual control object.

Next, the stabilization compensator provided by the present invention is described. The open-loop characteristic of the feedback control system described above is shown in FIG. 4 in terms of a frequency response characteristic. To be more specific, FIG. 4 shows the frequency response of a transfer function of the open loop of a control object which transfer function represents the relation between the value I of the current command and a detected torque T of the steering mechanism. As is shown in the figure, at the resonance frequency of the steering mechanism, the gain reaches a peak and then gets attenuated abruptly at frequencies higher than the resonance frequency. The vertical and horizontal axes of the figure represent the gain and the frequency of the steering mechanism respectively. A line (a) represents the transfer function P(s) of the actual control object whereas a line (b) shows the transfer function $P_n(s)$ of a model approximating the actual control object. The model is also referred to hereafter as an approximation model.

It should be noted that the control object, which transfer function is shown in FIG. 4, is in a free state, a state with no steering torque produced, and the tires of the vehicle are in a state not in contact with the surface of the road, that is, the tires are in a state not receiving the resistance from the surface of the road.

The stabilization compensator provided by the present invention is employed in an attempt to allow the transfer function $P_n(s)$ of the approximation model shown by the line (b) in FIG. 4 to be used for representing the actual control object, the transfer function P(s) of which is actually represented by the line (a) in the figure. The stabilization compensator is designed by finding conditions for not generating a sharp peak at the resonance frequency of the approximation model.

In the case of a control object showing a frequency characteristic like the one shown in FIG. 4, the transfer function thereof at control range frequencies (at frequencies $\leq \omega_{cont}$) can be approximated by a 2nd order function. With $P_n(s)$ representing the transfer function of the approximation model, the transfer function P(s) of an actual control object can be expressed by Eq. 1 as follows:

$$P(s) = P_n(s) \cdot (1 + \Delta_1(s)) \quad (1)$$

where P(s) is the transfer function of the actual control object, $P_n(s)$ is the transfer function of the approximation model, and $\Delta_1(s)$ is a difference between the transfer function of P(s) and $P_n(s)$, a multiplicative expression.

On the other hand, the transfer function P(s) of the actual control object expressed by Eq. 1 can be replaced by a mathematical model by using typically a system identification means. As a result, the transfer function P(s) can be expressed by Eq. 2 below as a product of $P_1(s)$ and $P_n(s)$. In other words, the transfer function P(s) can be defined as a system comprising two resonance systems.

$$P(s) = P_n(s) \cdot P_1(s) \quad (2)$$

where $P_1(s)$ represents a high-order characteristic of the model approximating the actual control object which characteristic is ignored in the transfer function $P_n(s)$ of the model approximating the actual control object.

The items $P_1(s)$ and $P_n(s)$ in Eq. 2 expressing the transfer function P(s) can each be expanded into a 2nd order polynomial expression which approximates a frequency characteristic curve of the actual control object. The polynomial expressions are defined by Eqs. 3 and 4 respectively as follows:

$$P_1(s) = \frac{d_2}{s^2 + d_1 s + d_2} \quad (3)$$

$$P_n(s) = \frac{K_p}{s^2 + a_1 s + a_2} \quad (4)$$

It should be noted that $P_1(s)$ may also be expressed by an equation other than a polynomial expression.

Notations a1 and a2 in Eq. 4 are coefficients which are determined when $P_n(s)$ is expanded into a polynomial expression. Symbols d1 and d2 in Eq. 3 are coefficients which are determined by the damping system and the resonance frequency of a high-order resonance system of the transfer function $P_1(s)$. Notation Kp is an arbitrary coefficient which is set at such a value that the gain of the transfer function $P_n(s)$ for the model approximating the actual control object becomes equal to the gain of the transfer function P(s) of the actual control object itself. Symbol s is the Laplacean operator.

The difference $\Delta_1(s)$ between the transfer function P(s) of the actual control object and the transfer function $P_n(s)$ of the approximation model thereof can be derived into from Eqs. 1, 2, 3 and 4 into Eq. 5 as follows:

$$\Delta_1(s) = \frac{s^2 + d_1 s}{s^2 + d_1 s + d_2} \quad (5)$$

Figure 5:
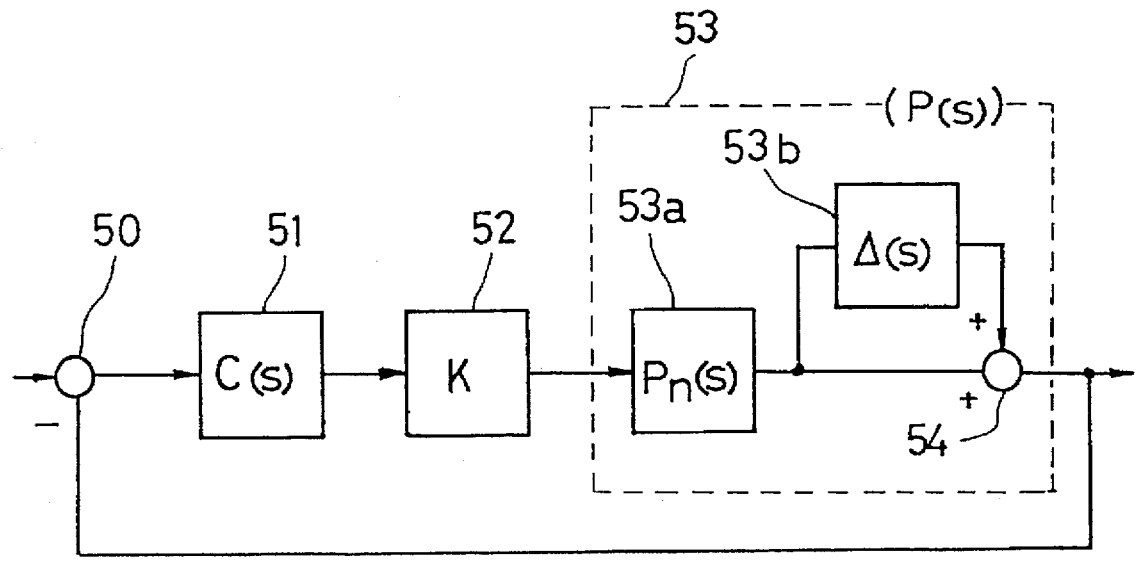
FIG. 5 is a diagram showing the characteristics of a steering mechanism to be controlled in terms of a transfer function thereof.

In order to simplify the study, the steering mechanism used as a control object is explained by referring to FIG. 5 which shows a block diagram depicting a transfer function of the steering mechanism. Reference numeral 51 denotes a stabilization compensator having a characteristic C(s) and reference numeral 52 denotes a characteristic map memory unit for storing the gain K of an assistance torque command. Also in order to simplify the study, it is assumed that there is only one value of the gain K. Reference numeral 53 denotes the transfer function P(s) of the actual control object. Reference numerals 53a and 53b denote the transfer function $P_n(s)$ of the approximation model and the difference $\Delta_1(s)$ respectively. It should be noted that reference numerals 50 and 54 each denote an adder.

The stabilization compensator 21 provided by the present invention carries out pole zero cancellation processing for adding an input with an inverted characteristic in order to eliminate the peak at the resonance frequency of the resonance system which exhibits the transfer function P(s) of an actual control object. The actual control object has a frequency characteristic like the one shown by the line (a) in FIG. 4.

That is to say, for the transfer function $P_n(s)$ of the model approximating the actual control object expressed by Eq. 4, the characteristic C(s) of the stabilization compensator 21 is defined by Eq. 6. As is shown in Eq. 6, the numerator of Eq. 6 has the same elements as the denominator of Eq. 4 so that the peak is eliminated. The order of the denominator of Eq. 6 is set at 2, the minimum order for preserving the reliability of the characteristic C(s) of the stabilization compensator 21. Notations b1 and b2 are parameters which determine the response characteristic of the control system. The determination of the parameters b1 and b2 will be explained later.

$$C(s) = \frac{s^2 + a_1 s + a_2}{s^2 + b_1 s + b_2} \quad (6)$$

If the difference $\Delta_1(s)$ between the transfer function P(s) of the actual control object and the transfer function $P_n(s)$ of the approximation model thereof is ignored, the open-loop characteristic $G_{OPEN}$ of a control system which represents the steering mechanism shown in FIG. 5 in terms of a transfer function can be newly defined by Eq. 7 below, eliminating the term causing the resonance of the control object. That is to say, Eq. 7 expressing the open-loop characteristic $G_{OPEN}$ of the control system can be derived from Eqs. 4 and 6. The open-loop characteristic $G_{OPEN}$ of the control system is determined by the denominator of Eq. 6 which expresses the characteristic C(s) of the stabilization compensator 21.

$$G_{OPEN}(s) = K \cdot C(s) \cdot P_n(s) \quad (7)$$
$$= \frac{K \cdot K_P}{s^2 + b_1 s + b_2}$$

It should be noted that symbol K used in Eq. 7 is the gain of the assistance torque command.

In this case, the closed-loop characteristic $G_{CLOSE}$ of the control system can be expressed by Eq. 8 as follows.

$$G_{CLOSE}(s) = \frac{K \cdot K_P}{s^2 + b_1 s + b_2 + K \cdot K_P} \quad (8)$$
$$= \frac{K \cdot K_P / \omega_{cont}^2}{s^2 + 2\xi_1 \omega_{cont} s + \omega_{cont}^2}$$

When designing a control system, with respect to the limit frequency $\omega_{cont}$ determined by design specifications of the control frequency range, the parameter $b_2$ is determined so as to satisfy Eq. 9 given below. In addition, with respect to the damping factor $\xi_1$ determined by design specifications of the damping system, the parameter $b_1$ is determined so as to satisfy Eq. 10 given below. In this way, a response characteristic that satisfies the design specifications can be obtained.

$$\omega_{cont} = \sqrt{b_2 + K \cdot K_P} \quad (9)$$

$$\xi_1 = \frac{b_1}{2\omega_{cont}} \quad (10)$$

In the study described above, the difference $\Delta_1(s)$ between the transfer function P(s) of the actual control object and the transfer function $P_n(s)$ of the approximation model thereof is ignored. In the actual design, however, the difference $\Delta_1(s)$ between the transfer function P(s) of the actual control object and the transfer function $P_n(s)$ of the approximation model thereof must be taken into consideration. The existence of the difference $\Delta_1(s)$ between the transfer function P(s) of the actual control object and the transfer function $P_n(s)$ of the approximation model thereof imposes restrictions on the damping factor $\xi_1$ and the limit frequency $\omega_{cont}$ that can be achieved.

If the difference $\Delta_1(s)$ between the transfer function P(s) of the actual control object and the transfer function $P_n(s)$ of the approximation model thereof is taken into consideration, a sufficient condition for the stabilization of the control system is expressed by Eq. 11 given below in accordance with the small gain theorem.

$$\|T(s) \cdot \Delta_1(s)\|_\infty < 1 \quad (11)$$

where notation T(s) is a complementary sensitivity function in the control system shown in FIG. 5 and is expressed by Eq. 12 as follows:

$$T(s) = \frac{K \cdot C(s) \cdot P_n(s)}{1 + K \cdot C(s) \cdot P_n(n)} \quad (12)$$
$$= \frac{K \cdot K_c}{s^2 + b_1 s + b_2 + K \cdot K_c}$$

Furthermore, Eq. 11 can be rewritten into Eq. 13 as follows:

$$\|T(s) \cdot \Delta_1(s)\|_\infty \leq \|T(s)\|_\infty \|\Delta_1(s)\|_\infty < 1 \quad (13)$$

Accordingly, the sufficient condition for the stabilization of the control system can be expressed by Eq. 14 as follows:

$$\|T(s)\|^{-1} > \|\Delta_1(s)\| \quad (14)$$

Figure 6:
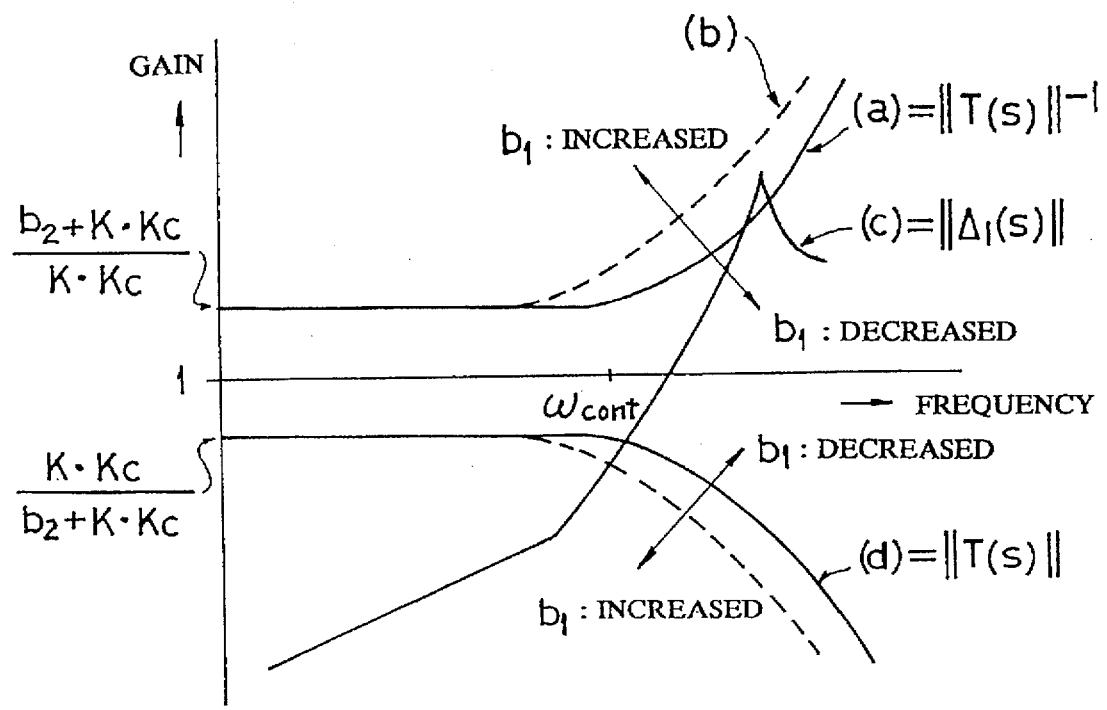
FIG. 6 is a characteristic diagram used for explaining a sufficient condition for stabilization of a control system.

FIG. 6 is a characteristic diagram used for explaining the sufficient condition for the stabilization of the control system which condition is expressed by Eq. 14. A line (a) shown in the figure represents $\|T(s)\|^{-1}$ of Eq. 14. The line (a) is shifted upward as the parameter b1 is increased as is shown by a line (b). When the parameter $b_1$ is decreased, on the other hand, the line (a) is shifted downward. A line (c) represents $\|\Delta_1(s)\|$ of Eq. 14 whereas a line (d) represents $\|T(s)\|$ which is the inverse of $\|T(s)\|^{-1}$ of Eq. 14.

When the line (a) shown in the figure representing $\|T(s)\|^{-1}$ is made always higher than the line (c) representing $\|\Delta_1(s)\|$ in FIG. 6, the stability of the control system is assured. In the figure, there is a portion at which the line (a) shown in the figure representing $\|T(s)\|^{-1}$ crosses the line (c) representing $\|\Delta_1(s)\|$. In such a case, there is a possibility for the control system to become unstable. In order to assure the stability of the control system with the limit frequency $\omega_{cont}$ of the design specifications for the above control frequency range sustained, it is necessary to increase the parameter b1 relevant to the design specifications of the damping system so as to shift the line (a) upward as is shown by the line (b).

In the study described above, the difference $\Delta_1(s)$ between the transfer function P(s) of the actual control object and the transfer function $P_n(s)$ of the approximation model thereof is taken into consideration. In addition, parameter variations must also be studied.

The parameter variations are studied as follows. Parameters that vary are the gain K of the assistance torque command and the coefficients a1 and a2 of the transfer function $P_n(s)$ of the approximation model.

Figure 7:
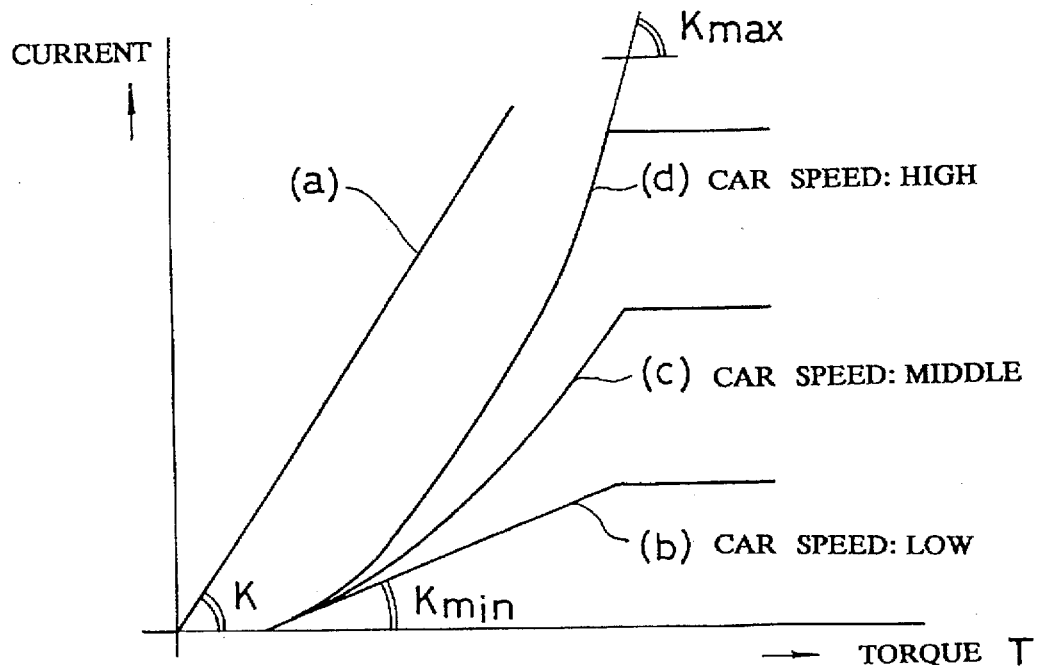
FIG. 7 is a diagram used for explaining values of an assistance torque command specifying a steering operation aiding power which values are stored in a characteristic map memory unit.

The gain K of the assistance torque command which gain is stored in the characteristic map memory unit has been treated so far as a single gain. In actuality, however, the gain K of the assistance torque command varies non-linearly with changes in car speed V and steering torque T as is shown in FIG. 7. To put it in detail, a line (a) shown in the figure represents a single value of the gain K of the assistance torque command. Lines (b) and (c) represent gains K of the assistance torque command in case of car speed V in the low-speed and middle-speed regions respectively. A line (d) represents the gain K of the assistance torque command in case of car speed V in the high-speed region.

Since the non-linearity of the gain K of the assistance torque command can be interpreted as variations in gain K, the gain K of the assistance torque command can be expressed by Eq. 15 as follows:

$$K_{min} = \Delta K_1 \cdot K \leq K \leq \Delta K_2 \cdot K = K_{max} \quad (15)$$

where notations $\Delta k1$ and $\Delta k2$ denote a minimum rate of change and a maximum rate of change in gain K of the assistance torque command respectively.

Let $\Delta_2(s)$ represent a maximum of variations in gain K of the assistance torque command. $\Delta_2(s)$ can then be expressed by Eq. 16 as follows:

$$\Delta_2(s) = _{max}(\Delta K) = \Delta K_2 \quad (16)$$

$$\Delta K_1 \leq \Delta K_2$$

Next, the coefficients a1 and a2 are examined. In the study described so far, characteristic parameters of the model approximating the actual control object are assumed to be the same as characteristic parameters of the actual control object itself. In actuality, however, there are many cases in which the characteristic parameters of the model approximating the actual control object do not accurately match the characteristic parameters of the actual control object itself. Let $\Delta_3(s)$ be an error representing a difference between the characteristic parameters of the model approximating the actual control object and the characteristic parameters of the actual control object itself. $\Delta_3(s)$ can then be expressed by Eq. 17 below. In general, $\Delta_3(s)$ represents variations which are brought about by changes in usage state. A variation in stiffness of the steering system caused by the driver's grabbing of the steering wheel is an example of this change.

$$\Delta_3(s) = \frac{s^2 + a_1^* s + a_2}{s^2 + a_1 s + a_2} - 1 \quad (17)$$

$$= (a_1^* - a_1)s + (a_2^* - a_2) s^2 + a_1 s + a_2$$

where symbols $a_1^*$ and $a_2^*$ are parameters of the actual control object.

The error $\Delta_3(s)$ resulting from the pole zero cancellation processing described above can be interpreted as discrepancies in damping factor and corner frequency of the characteristic between the model approximating the actual control object and the actual control object itself. Accordingly, Eq. 17 can be rewritten into Eq. 18 as follows:

$$\Delta_3(s) = \frac{(2 \cdot \xi_1^* \omega_1^* - 2 \cdot \xi_1 \omega_1)s + (\omega_1^{*2} - \omega_1^2)}{s^2 + 2\xi_1 \omega_1 s + \omega_1^2} \quad (18)$$

where $\xi_1$ is the damping factor of the model, $\omega_1$ is the corner frequency of the model, $\xi_1^*$ is the damping factor of the actual control object and $\omega_1^*$ is the corner frequency of the actual control object.

A technique for assuring stability in a case where there is a discrepancy in corner frequency between the actual control object and the approximation model thereof, that is, in a case where $\omega_1^*$ is not equal to $\omega_1$ is described as follows.

Let the damping factor $\xi_1$ of the actual control object treated in this case be much smaller than unity ($\xi_1 \ll 1$).

It is assumed that $\xi_1^*$ is approximated to be equal to $\xi_1$ while $\omega_1^*$ is not equal to $\omega_1$. This assumption holds true for an ordinary electric power steering mechanism.

The difference $\Delta(s)$ in characteristic between the model approximating the actual control object and the actual control object itself can be expressed by Eq. 19 as follows:

$$\|\Delta(s)\| = \|\Delta_1(s) + \Delta_2(s) + \Delta_3(s)\| \quad (19)$$

The sufficient condition for the stabilization of the control system has been expressed earlier by Eq. 14. By substituting $\|\Delta(s)\|$ of Eq. 19 for $\|\Delta_1(s)\|$ of Eq. 14, a sufficient condition for the stabilization of a control system wherein the variation $\Delta_2(s)$ in gain K stored in the characteristic map memory unit and the error $\Delta_3(s)$ are taken into consideration. As is described above, the error $\Delta_3(s)$ represents differences in characteristic parameters between the model approximating the actual control object and the actual control object itself which differences result from the pole zero cancellation processing.

Figure 8:
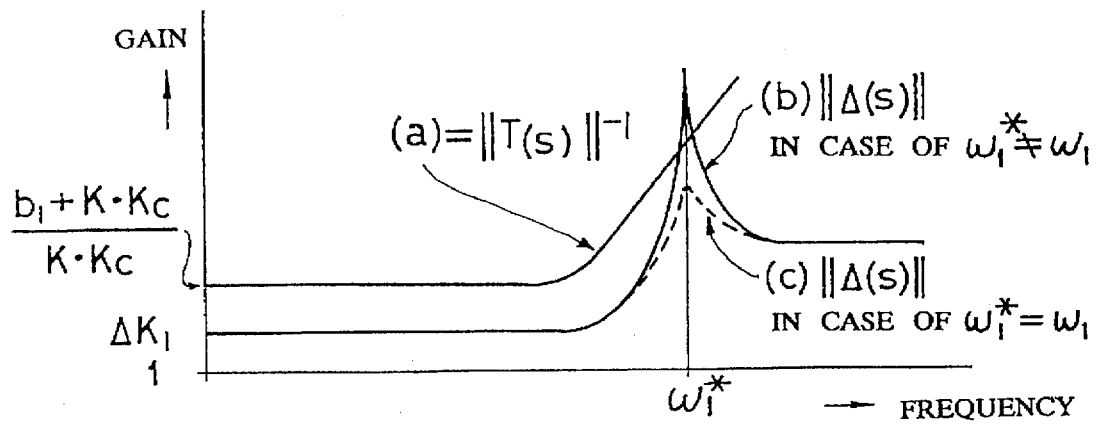
FIG. 8 is a characteristic diagram used for explaining a sufficient condition for stabilization of a control system.

FIG. 8 is a characteristic diagram used for explaining the sufficient condition for the stabilization of a control system. It is obvious from the figure that, if there is a discrepancy in corner characteristic between the actual control object and the model approximating the actual control object, that is, if $\omega_1^*$ is not equal to $\omega_1$, the gain $\|\Delta(s)\|$ resonates at the frequency $\omega_1$ as is indicated by a line (b), causing the control system to vibrate or to become unstable. If $\omega_1^* = \omega_1$, on the other hand, the gain $\|\Delta(s)\|$ is represented by a line (c), resulting the control system in stable. It should be noted that a line (a) represents $\|T(s)\|^{-1}$ of Eq. 14.

Figure 9:
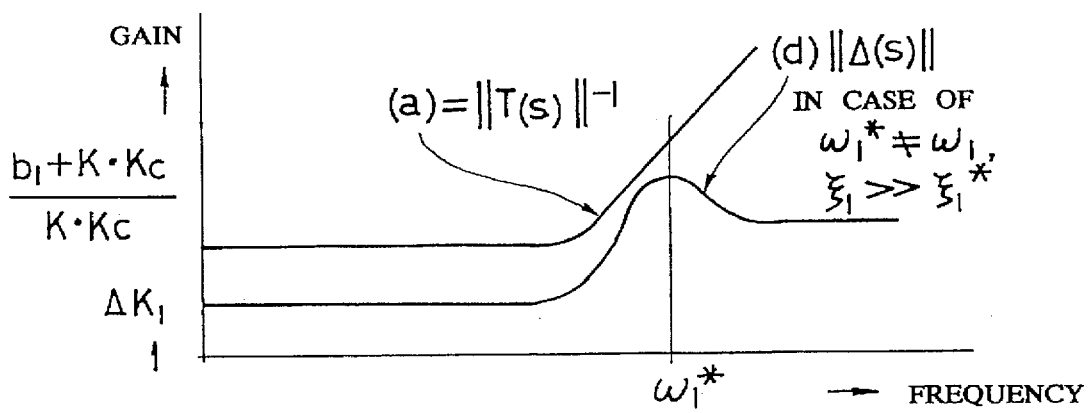
FIG. 9 is a characteristic diagram showing a state in which the control system has been stabilized.

The present invention gets rid of strict pole zero cancellation processing in order to prevent the control system from vibrating due to the difference ($\omega_1^* - \omega_1$) between $\omega_1^*$ and $\omega_1$ which are given as design specifications of the control frequency range. FIG. 9 is a characteristic diagram showing a state in which the control system has been stabilized. By setting the damping factor $\xi_1$ at a value that has a sufficient effect on damping ($\xi_1 \gg \xi_1^*$), the gain $\|\Delta(s)\|$ at the frequency $\xi_1$ has its peak suppressed as is shown by a line (d) in the figure even if $\omega_1^*$ is not equal to $\omega_1$.

The characteristic C(s) of the stabilization compensator 21 provided by the present invention has been determined as is described above. In order to implement the characteristic C(s) of the stabilization compensator 21 into digital values, the generally known discrete mathematics is adopted to express the characteristic C(s) by typically Eq. 20 as follows:

$$C_{(Z^{-1})} = \frac{f_1 + f_2 \cdot z^{-1} + f_3 \cdot z^{-2}}{1 + e_1 \cdot z^{-1} + e_2 \cdot z^{-2}} \quad (20)$$

where symbols f1, f2, f3, e1 and e2 are coefficients determined from the coefficients a1, a2, b1 and b2 of the stabilization compensator 21 represented by the characteristic C(s) which is determined by substituting the transfer function $P_n(s)$ Of the model approximating the actual control object for the transfer function P(s) of the actual control object itself expressed by Eq. 2 and by using $\Delta(s)$ described above.

Notation z-1 is an operator indicating an immediately previous sample whereas notation z-2 is an operator indicating a sample prior to the sample z-1 in the data sampling.

Eq. 20 defines a relation 1between the steering torque T and the output of the stabilization compensator 21. Let notation T(k) represent an A/D-transformed value of the steering torque T and notation Tc(k) represent the output of the stabilization compensator 21. A relation between T(k) and Tc(k) can then be expressed by Eq. 21 as follows:

$$Tc(k) = f_1 T_{(k)} + f_2 T_{(k-1)} + f_3 T_{(k-2)} - \quad (21)$$

$$e_1 Tc_{(k-1)} - e_2 Tc_{(k-2)}$$

where T(k) is the A/D-transformed value of the steering torque T obtained from the data sampling, T(k−1) is a value of the immediately previous sample of the steering torque T(k), T(k−2) is a value of the immediately previous sample of the steering torque T(k−1), Tc(k) is an output of the stabilization compensator 21, Tc(k−1) is a value of the immediately previous sample of the output Tc(k) and Tc(k−2) is a value of the immediately previous sample of the output Tc(k−1).

Figure 10:
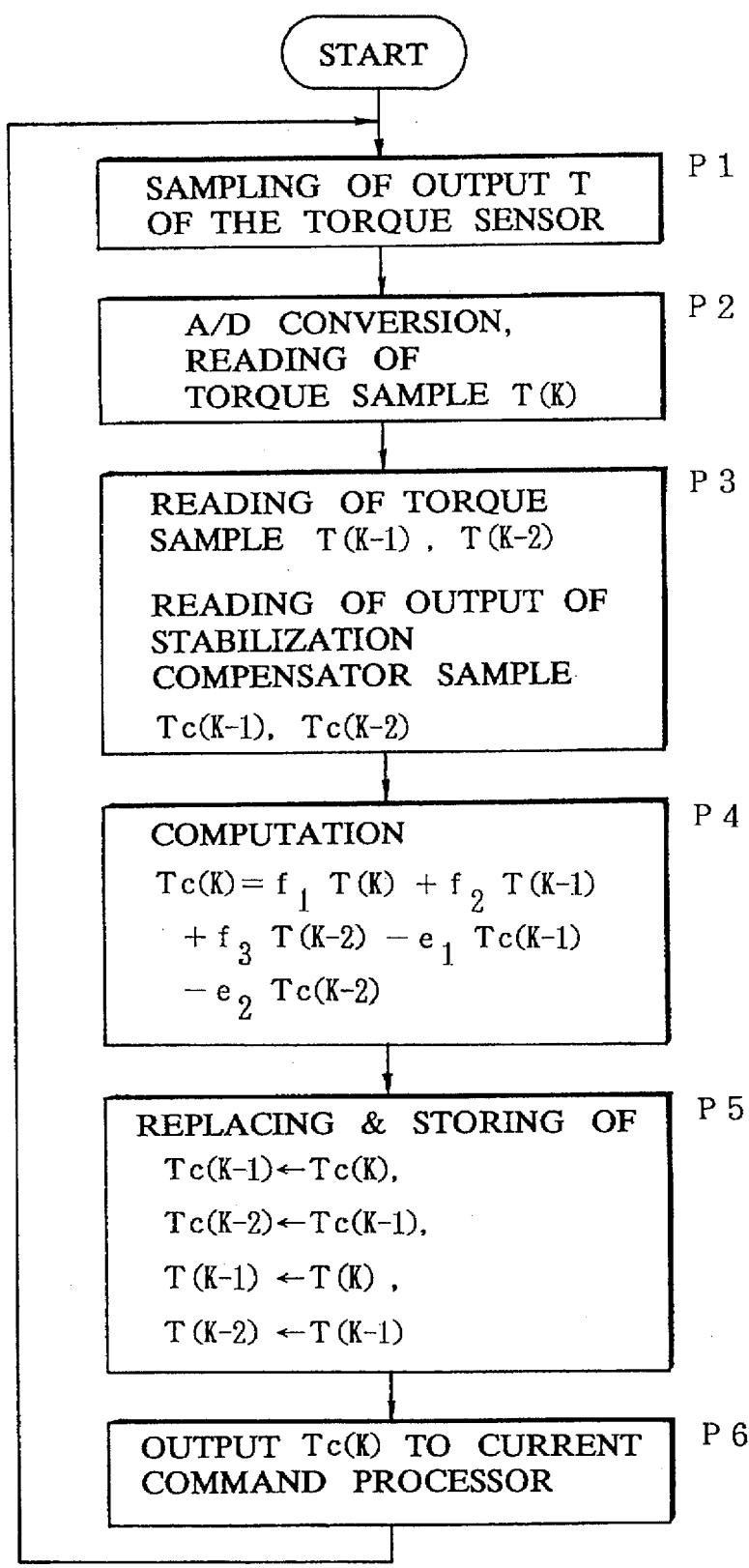
FIG. 10 is a flowchart used for explaining a function of a stabilization compensator which function is executed by a CPU.

The stabilization compensator 21 with a characteristic expressed by the characteristic C(s) described earlier has a function in the electronic control circuit 13 shown in FIG. 2 which function is implemented by the execution of the processing of Eq. 21 by means of a CPU. The processing executed by the CPU is explained by referring to a flowchart shown in FIG. 10 as follows.

First of all, the output T of the torque sensor is sampled at a step P1. The processing flow then continues to a step P2 to read the value of a detected steering torque sample T(k) resulting from A/D conversion of the output T. The processing flow then proceeds to a step P3 to read an immediately previous sample value T(k−1) of the steering torque processed earlier, a previous sample value T(k−2) prior to the sample value T(k−1), and outputs Tc(k−1) and Tc(k−2) of the stabilization compensator from a memory unit.

The processing flow then continues to a step P4 to carry out computation of Tc(k) based on Eq. 21. The processing flow then proceeds to a step P5 to store Tc(k), Tc(k−1), T(k) and T(k−1) into the memory unit in place of Tc(k−1), Tc(k−2), T(k−1) and T(k−2) respectively.

The processing flow then proceeds to a step P6 to supply the computation result Tc(k) to the current-command processor 22 as an output of the stabilization compensator 21.

As described earlier, the stabilization compensator provided by the present invention has a function resembling that of a conventional band eliminating filter inserted into a later stage of the torque sensor in order to eliminate a resonance frequency component from a signal output by the torque sensor. It is an object of the conventional band eliminating filter to improve the gain characteristic by eliminating the resonance frequency component which is generated by the spring element of the torque sensor, the steering wheel's moment of inertia and the motor's moment of inertia.

In contrast with the conventional band eliminating filter, however, the stabilization compensator provided by the present invention carries out pole zero cancellation processing to add an input with an inverted characteristic in order to eliminate the peak at the resonance frequency of the resonance system employed in the control object as has been described above. Accordingly, the stabilization compensator has an entirely different constitution and a completely different function in that not only does it improve the gain characteristic of the resonance frequency component but the stabilization compensator also caries out compensation covering the phase characteristic as well.

Furthermore, the stabilization compensator controls the steering feeling by means of tuning the control system response which is defined by the denominator of the characteristic C(s) of the stabilization compensator.

As is described above, according to the present invention, a stabilization compensator having a characteristic expressed by the characteristic C(s) is provided at a later stage of a torque sensor for detecting a steering torque in order to remove a peak at the resonance frequency of a resonance system comprising spring and inertia elements which peak value is included in the detected torque. The stabilization compensator also compensates for a phase shift at the resonance frequency which phase shift disturbs the stability and responsiveness of the control system. As a result, the stability and responsiveness of the control system employed in the electric power steering system can be improved by means of a control apparatus having a simple constitution.

It is further understood by those skilled in the art that the foregoing description explains a preferred embodiment of the disclosed apparatus and that various changes and modifications can be made to the present invention without departing from the spirit and scope thereof.

What is claimed is:

1. A control apparatus employed in electric power steering system for controlling the output of a motor for providing a power aiding a steering force to a steering mechanism in accordance with the value of a current control signal computed from the magnitude of a detected motor current and the value of a current command signal computed in accordance with at least a steering torque generated at a steering shaft, comprising:

a stabilization compensator for compensating the stability of said control apparatus provided at a later stage of a torque sensor for detecting said steering torque;

wherein said stabilization compensator has a function for eliminating a peak at a resonance frequency of a resonance system comprising inertia and spring elements employed in said electric power steering system and has a characteristic expressed by the following characteristic C(s) which functions to improve the stability and responsiveness of said control system:

$$C(s)=(s^2+a_1 s+a_2)/(s^2+b_1 s+b_2)$$

where notation s is the Laplacean operator and symbols $a_1$, $a_2$, $b_1$ and $b_2$ denote parameters determined by said resonance frequency of said resonance system.

2. A control apparatus employed in electric power steering system according to claim 1, wherein said control apparatus is constituted to include an electronic control circuit based on a microcomputer.

3. A control apparatus employed in electric power steering system according to claim 2, wherein said stabilization compensator serves as a functional means implemented by execution of processing based on said characteristic C(s) by said microcomputer employed in said electronic control circuit.

4. A control apparatus employed in electric power steering system according to claim 3, wherein said characteristic expressed by said characteristic C(s) is a characteristic implemented by execution of processing based on the following numerical arithmetic expression Tc(k) by said microcomputer employed in said electronic control circuit:

$$Tc(k)=f_1 T(k)+f_2 T(k-1)+f_3 T(k-2)-e_1 Tc(k-1)-e_2 Tc(k-2)$$

where T(k) is an A/D transformed value of said steering torque T obtained from data sampling, T(k−1) is the value of an immediately previous sample of said steering torque T(k), T(k−2) is a value of the immediately previous sample of said steering torque T(k−1), Tc(k) is an output of said stabilization compensator, Tc(k−1) is a value of an immediately previous sample of said output Tc(k), Tc(k−2) is a value of the immediately previous sample of said output Tc(k−1), and $f_1$, $f_2$, $f_3$, $e_1$ and $e_2$ are parameters determined by said resonance frequency of said resonance system.

5. A control apparatus employed in electric power steering system for controlling the output of a motor for providing a power aiding a steering force to a steering mechanism in accordance with the value of a current control signal computed from the magnitude of a detected motor current and the value of a current command signal computed in accordance with at least a steering torque generated at a steering shaft, comprising:

a torque sensor for detecting said steering torque generated at said steering shaft;

a motor-current detecting circuit for detecting a current flowing to said motor; and an electronic control circuit based on a microcomputer for computing the value of said current control signal from the detected motor current and the value of said current command signal computed in accordance with at least said steering torque; wherein said electronic control circuit is provided a stabilization compensator having a characteristic expressed by the following characteristic C(s) for compensating the stability of said control apparatus with respect to said steering torque detected:

$$C(s)=(s^2+a_1s+a_2)/(s^2+b_1s+b_2)$$

where notation s is the Laplacean operator and symbols $a_1$, $a_2$, $b_1$ and $b_2$ denote parameters determined by a resonance frequency of a resonance system included in said electric power steering system.

6. A control apparatus employed in electric power steering system according to claim 5, wherein said stabilization compensator is designed to carry out data processing based on the following numerical arithmetic expression Tc(k) by means of said microcomputer employed in said electronic control circuit:

$$Tc(k)=f_1T(k)+f_2T(k-1)+f_3T(k-2)-e_1Tc(k-1)-e_2Tc(k-2)$$

where T(k) is an A/D transformed value of said steering torque T obtained from data sampling, T(k−1) is a value of an immediately previous sample of said steering torque T(k), T(k−2) is a value of the immediately previous sample of said steering torque T(k−1), Tc(k) is an output of said stabilization compensator, Tc(k−1) is a value of an immediately previous sample of said output Tc(k), Tc(k−2) is a value of the immediately previous sample of said output Tc(k−1), and $f_1$, $f_2$, $f_3$ $e_1$ and $e_2$ are parameters determined by said resonance frequency of said resonance system.

* * * * *